United States Patent [19]
Hirata

[11] Patent Number: 5,221,882
[45] Date of Patent: Jun. 22, 1993

[54] MOTOR SERVO APPARATUS
[75] Inventor: Masafumi Hirata, Tokyo, Japan
[73] Assignee: Fuji Photo Film Co., Ltd., Kanagawa, Japan
[21] Appl. No.: 701,094
[22] Filed: May 16, 1991
[30] Foreign Application Priority Data
  May 22, 1990 [JP] Japan ................... 2-130276
[51] Int. Cl.$^5$ ............................................. G05B 11/01
[52] U.S. Cl. ........................... 318/560; 318/561; 318/606; 318/652; 318/654; 318/607; 318/608
[58] Field of Search ............... 318/560, 561, 606, 652, 318/654, 607, 608

[56] References Cited
U.S. PATENT DOCUMENTS
4,694,234 9/1987 Naga et al. ............... 318/603 X
4,740,736 4/1988 Sidman et al. ............ 318/608 X
4,933,985 6/1990 Fukushima ................ 388/813 X
5,089,757 2/1992 Wilson .................... 318/560 X Primary Examiner—William M. Shoop, Jr.
Assistant Examiner—Karen Masih

[57] ABSTRACT

Where $T_1$ is a period of a dynamic operation range of a phase comparative waveform of a motor servo apparatus, and a period $T_0$ of a reference phase signal is measured, the reference phase signal is delayed by $T_3 = T_0 - T_1/2$ to obtain a gate signal. The dynamic operation range is started by the gate signal. Thus, the operational center of the phase system is brought in line with the dynamic operation range. The operation is made symmetrical in the dynamic operation range to achieve a rapid servo lock and a stable phase control over the motor servo apparatus, even at the start of the motor or when an external perturbation occurs.

12 Claims, 10 Drawing Sheets

DIGITAL CIRCUIT FOR VARIABLE DELAY

FIG.6 ANALOG CIRCUIT FOR PHASE ERROR DETECTION

MOTOR SERVO APPARATUS

FIELD OF THE INVENTION

This invention relates to a motor servo apparatus. More specifically, it relates to an improvement of a motor servo apparatus to bring an operational center of a phase system in line with a setting center, that is, the center of a dynamic operation range of comparative a operation waveform, according to a change in period of a reference phase signal.

BACKGROUND OF THE INVENTION

As shown in FIG. 8, the phase system of a known motor servo apparatus includes a reference phase generation circuit 1, a delay circuit 2, and a phase error detection circuit 3.

The reference phase generation circuit 1, as shown in FIG. 9(a), generates a pulse array as a reference phase signal 4, which is applied to the delay circuit 2. The operation of this delay circuit 2 will be described here with the rising point of the reference phase signal 4 as a reference phase.

The delay circuit 2 includes two monomultivibrators 5 and 6, which produce a gate signal by delaying the reference phase signal 4 by a predetermined time period, and supply this delayed signal to the phase error detection circuit 3.

The phase error detection circuit 3 includes a trapezoidal wave generation circuit 9 and a sample and hold circuit 10. The trapezoidal wave generation circuit 9 generates a trapezoidal signal 11, as shown in FIG. 9(b), as a comparative operation waveform, with an operation starting point 12 of a slope region, which is the dynamic operation range, coinciding with the rising point of the gate signal 8. The sample and hold circuit 10 receives a PG signal 18 of 1 pulse per 1 turn as shown in FIG. 9(c) from a rotation phase detector 17 of a motor 16. The sample and hold circuit 10 samples and holds the value of the trapezoidal signal 11 at every rising point of the PG signal 18, which is outputted as a phase error signal 13.

By applying the phase error signal 13 to a motor drive circuit 15 through an appropriate phase compensation circuit 14, the rotation phase of the motor 16 is controlled so that the rising point of the PG signal 18 coincides with the rising point of the reference phase signal 4.

In this case, the phase error signal 13 must be symmetrical about an operational center 20 in the dynamic operation range 19 of the trapezoidal signal 11, according to changes in the rotation phase of the motor 16. Otherwise, a servo lock will come off, or, the phase system will not be servo locked. Furthermore, when the servo lock comes off due to an external perturbation, the servo lock becomes delayed, or, even if the phase system is servo locked, a deviation of the steady position occurs.

Therefore, a time constant of each of the monomultivibrators 5 and 6 of the delay circuit 2 is previously adjusted and fixed. In this case, the first monomultivibrator 5 is for phase adjustment, which generates a Q output 7 with a constant pulse width, as shown in FIG. 9(d), at every rising point of the reference phase signal 4. The first monomultivibrator 5 then applies the output 7 to the second monomultivibrator 6. The second monomultivibrator 6 is for so-called trapezoidal position determination, which generates a Q output with a constant pulse width as shown in FIG. 9(e) at every rising point of the Q output 7 of the first monomultivibrator 5, which is applied as the gate signal 8 for determining an operation starting point 12 to the trapezoidal wave generation circuit 9. During the time when the gate signal is at a high level "H," the trapezoidal signal 11 is at a lower limit value of the dynamic operation range. Furthermore, during the time when, after the dynamic operation is completed for a constant period $T_1$, the gate signal 8 is at a low level "L," the trapezoidal signal 11 is at an upper limit value of the dynamic operation range.

Therefore, in the conventional art device shown in FIG. 8, if the reference phase signal 4 is a predetermined one with a constant period, the operational center 20 of the phase error signal 13 coincides with the center of the dynamic operation range 19, and phase control is performed about the operational center 20.

However, when the reference phase generation circuit 1 is of a variable period type, or is operated by an external signal 21 to generate a reference error signal 11 with an unknown or indefinite period, the operational center of the phase error signal 13 exceeds the center of the dynamic operation range. Furthermore, in an extreme case, the operational center occurs at, or approaches, the upper or lower limit of the trapezoidal signal 11.

FIG. 10 shows an operation timing diagram when the period of the reference phase signal 4 becomes longer than that shown in FIG. 9(a) for example. In this case, since the operational center 20 shifts from the center 22 of the dynamic operation range 19 to near the upper limit, the operational center 20 is considered to decrease the gradient of the dynamic operation range of the trapezoidal signal 11. However, since the gradient of the dynamic operation range is a key point in determining the servo gain, the gradient cannot be moderated too much, in view of the gain which must be increased as much as possible.

For a reference phase signal in which the operational center occurs at, or approaches, the upper or lower limit of the trapezoidal signal 11, a time constant select circuit 23 has been considered to be provided, as shown in FIG. 8, in the trapezoidal position determination monomultivibrator 6, so that the servo lock does not come off.

However, this method increases the time constant select circuit 23, and in turn, the packaging space on the circuit board, the number of parts, and the production cost. Furthermore, since the time constant of the monomultivibrator 6 can only be re-set to the extent that the servo lock does not come off, it is not guaranteed that the operational center will coincide exactly with the center 22 of the dynamic operation range 19, which will thus cause a considerable deviation in the steady position.

As another measure, a method has been considered in which a time constant select circuit 24 is provided in the phase adjustment monomultivibrator 5, as shown in FIG. 8. In this case, however, the operational center approaches, to some extent, the center 22 of the dynamic operation range 19, but the phase difference between the reference phase signal 4 and the PG signal 18 is not removed.

SUMMARY OF THE INVENTION

In view of eliminating the above defects contained in know systems, it is a primary object of the present invention to provide a motor servo apparatus in which the operational center of the phase system always coincides with the center of a dynamic operation range of the comparative operation waveform, even when the period of the reference phase signal varies.

In accordance with the present invention for carrying out the above identified object, there is provided a motor servo apparatus comprising a reference phase period detecting circuit for measuring the period of a reference phase signal, a variable delay circuit, having a variable delay amount, for delaying the reference phase signal and outputting a gate signal to determine a starting point of a dynamic operation range of a comparative operation waveform of a phase error detection circuit, and a delay amount control circuit for controlling the delay amount of the variable delay circuit, with the delay amount control circuit being a circuit for controlling a delay amount $T_3$ equal to $T_0-T_1/2$, where $T_0$ is a measured period and $T_1$ is a period of the dynamic operation range.

In this case, it is preferable to set the comparative operation waveform of the phase error detection circuit to an upper limit or a lower limit of the dynamic operation range for a period of $T_4=(T_0-T_1)/2$.

The variable delay circuit and the phase error detection circuit, individually, may be one of an analog configuration or a digital configuration.

The time of the center of the dynamic operation range is $T_3+T_1/2$, and is measured from a reference phase, which is set to $T_0$ by controlling $T_3=T_0-T_1/2$. Therefore, even when the period of the reference phase signal varies, the center of the dynamic operation range is varied by the same amount, and always coincides with the operational center of the phase system as a result.

Furthermore, by setting the comparative operation waveform at the upper limit or the lower limit during the period of $T_4=(T_0-T_1)/2$, the comparative operation waveform becomes symmetrical about the operational center. This results in a faster servo lock at the start or when an external perturbation occurs.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

Figure 1:
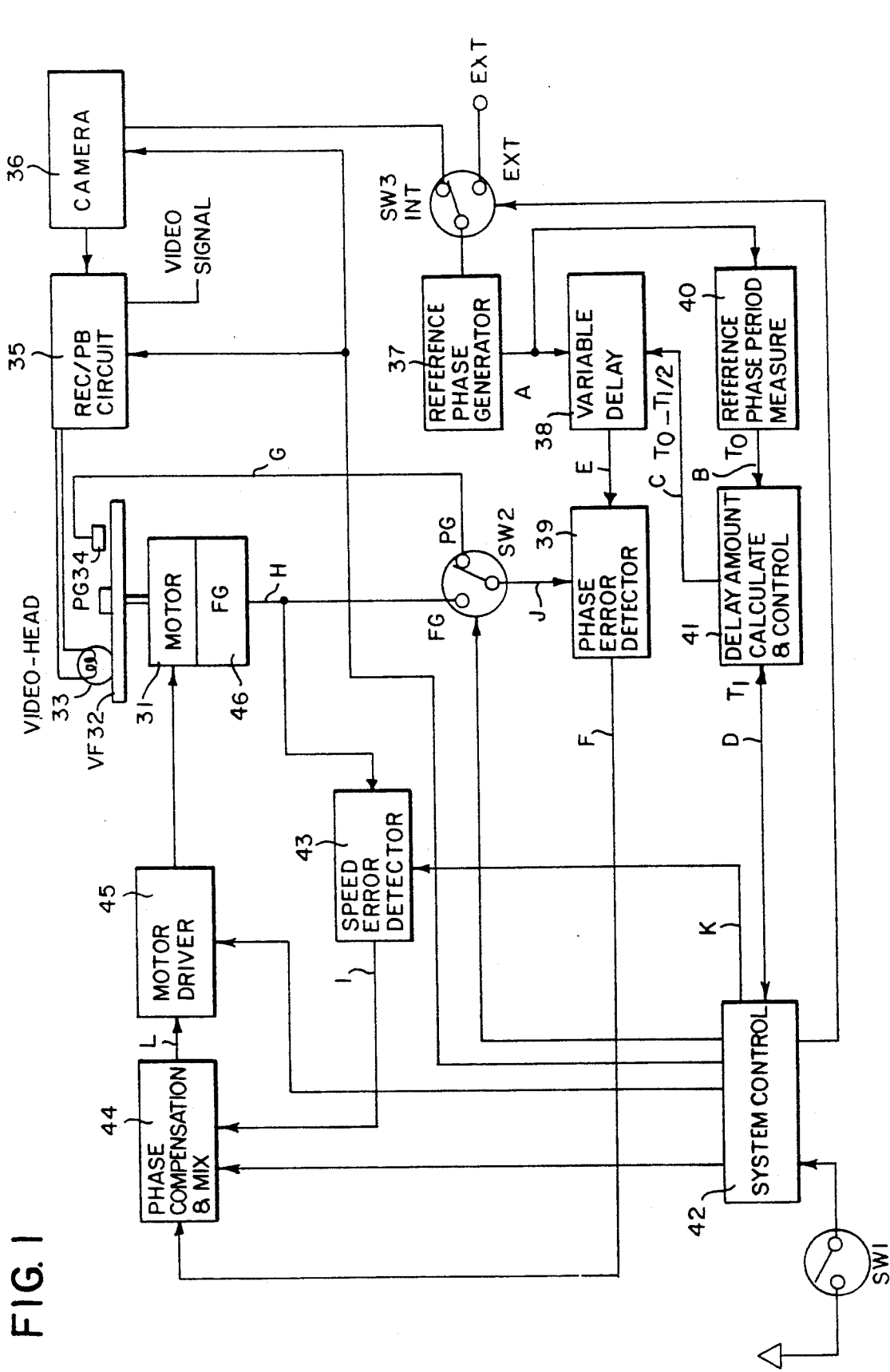
FIG. 1 is a schematic view showing a circuit arrangement of an embodiment of the present invention.

In the drawings, numeral 31 indicates a motor; numeral 34 indicates a PG detector; numeral 37 indicates a reference phase generation circuit; numeral 38 indicates a variable delay circuit; numeral 39 indicates a phase error detection circuit; numeral 40 indicates a reference phase period detecting circuit; numeral 41 indicates a delay amount calculation and control circuit; numeral 42 indicates a system control circuit; numeral 46 indicates an FG detector; numeral 47 indicates a trapezoidal phase comparative waveform; A indicates a reference phase signal; B indicates period data; C indicates delay amount data; D indicates period data of the dynamic operation range; E indicates a gate signal; J indicates a rotation phase detection signal; and F indicates a phase error signal.

DETAILED DESCRIPTION OF THE PREFERRED EMBODIMENTS

The preferred embodiments according to the present invention will now be described with reference to FIG. 1 to FIG. 7.

FIG. 1 shows an embodiment in which the present invention is applied to an electronic still camera. A video floppy disk (magnetic disk) 32 is chucked onto a spindle of a motor 31 to rotate. During recording, a signal obtained from a camera device 36 is processed by a recording and reproduction circuit 35, and a recording current is applied to a video head to record a video signal on the video floppy disk. During reproduction, a signal is reproduced by the video head 33 from the rotating video floppy disk 32, and processed by the recording and reproduction circuit 35 to output a video signal.

To control a rotation phase of the motor 31, there are provided a reference phase generation circuit 37, a variable delay circuit 38, a phase error detection circuit 39, a reference phase period detecting circuit 40, and a delay amount calculation and control circuit 41. To control a rotational speed of the motor 31, there is provided a speed error detection circuit 43. Furthermore, to drive the motor 31 using a phase error signal F and a speed error signal I, a phase compensation mixing circuit 44 and a motor drive circuit 45 are provided. Numeral 42 indicates a system control circuit, which controls the recording and reproduction circuit 35 and the camera device 36, as well as the delay amount calculation control circuit 41 (for setting the period of the dynamic operation range), the speed error detection circuit 43 (for providing the target rotational speed instruction), the phase compensation mixing circuit 44 (for providing the phase compensation select instruction), the motor drive circuit 45 (for providing the start/stop instruction), a switch $SW_2$ (for providing the select instruction to select which signal is used, a PG signal G from a PG detector for detecting the rotation phase of the video floppy disk 32, or and FG signal H from an FG detector 46 for detecting the rotational speed of the motor 31), and a switch $SW_3$ (for providing the select instruction to synchronize the reference phase generation circuit 37 internally with a signal from the camera device 36 or externally with a signal from an EXT terminal). A switch $SW_1$ determines the start/stop condition of the system control circuit 42.

Figure 2:
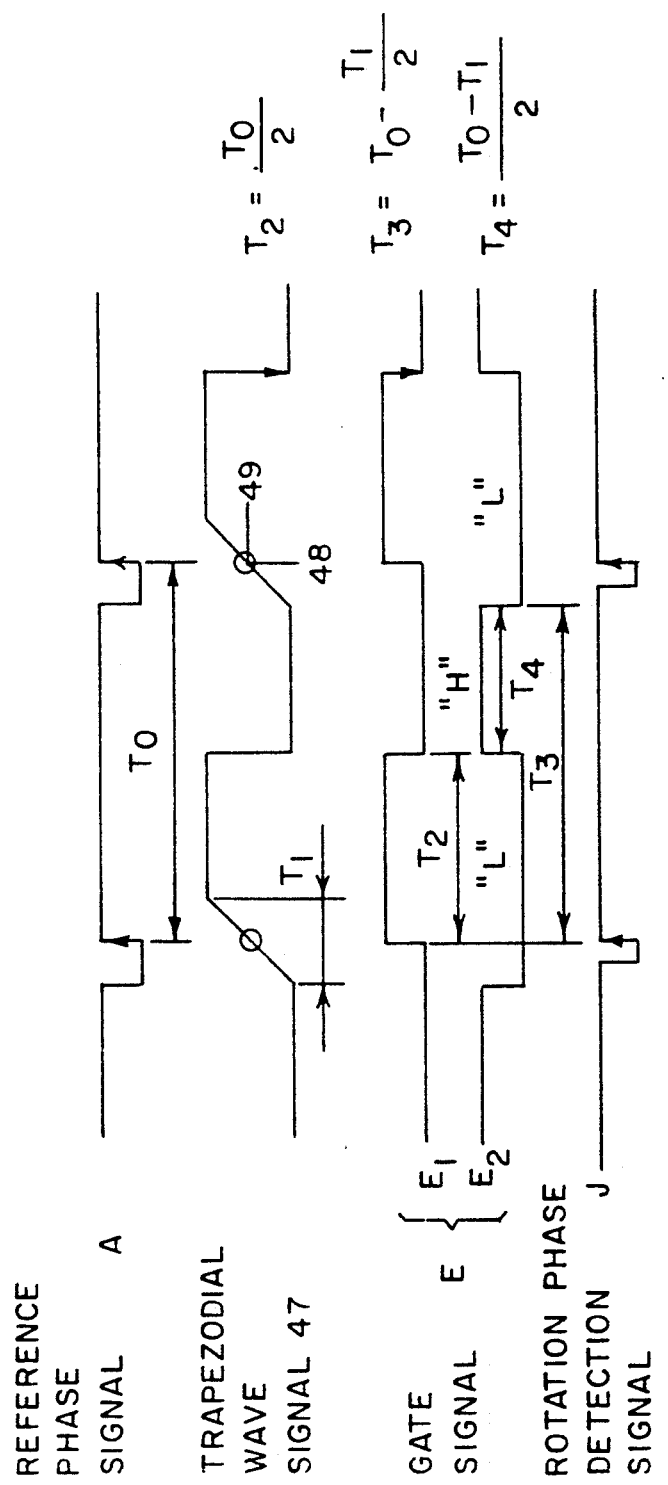
FIG. 2 and FIG. 3 are diagrams showing the operation timing.

The reference phase generation circuit 37 receives a sync signal from the camera device 36 through the switch $SW_3$ or an external sync signal (normally a vertical sync signal $V_{sync}$) from the EXT terminal, performs noise gate processing and the like on the sync signal, and then performs a phase adjustment to form a reference phase signal A as shown in FIG. 2. The reference signal A is outputted to the reference phase period detecting circuit 40 and the variable delay circuit 38. In this embodiment, the rising point of the reference phase signal A is used as the reference phase.

The reference phase period detecting circuit 40 measures a period $T_0$ of the reference phase signal A, and outputs period data B from the reference phase period detecting circuit 40 to the delay amount calculation control circuit 41.

The delay amount calculation control circuit 41 calculates a delay amount $T_3$ by $$T_3 = T_0 - T_1/2$$

from the period data B from the reference phase period detecting circuit 40 and data D of period $T_1$ for the dynamic operation range of a phase comparison given from the system control circuit 42. The delay amount calculation control circuit 41 then outputs the result as delay amount data C to the variable delay circuit 38.

The variable delay circuit 38 delays the reference phase signal A by the time $T_3$ of the delay amount data, C and outputs a resultant gate signal E as shown in FIG. 2 to the phase error detection circuit 39.

Referring to FIG. 2, the resultant gate signal E of the variable delay circuit 38 includes two-step gate signals $E_1$ and $E_2$, of which the first gate signal $E_1$ rises at the rising point of the reference phase signal A and falls after a time $T_2$, and the second gate signal $E_2$ rises at the falling point of the first gate signal $E_1$ and falls after time $T_4 = (T_3 - T_2)$. This second gate signal $E_2$ is outputted as the resultant gate signal E to the phase error detection circuit 39.

The phase error detection circuit 39 begins dynamic operation of a trapezoidal comparative operation waveform 47 as shown in FIG. 2 at the falling time of the gate signal E. That is, the dynamic operation begins at a time delayed by $T_3$ from the falling point of the reference phase signal A. The dynamic operation continues for a time $T_1$ determined by the system control circuit 42. For the time $T_4$ before that where the gate signal $E_2$ is at a high level "H," the trapezoidal comparative operation waveform 47 is controlled to the lower limit value of the dynamic operation range. Then, the PG signal G or the FG signal H, through the switch $SW_2$, is inputted as a rotation phase detection signal J of the motor 31. A phase comparison is then made by taking in the value of the trapezoidal comparative operation waveform 47 at the rising point of the signal J, and the phase error signal F is outputted as a phase error amount, to the phase compensation mixing circuit 44.

In this case, since $T_0$ is a measured period and $T_1$ is a preset value, both being known values, the timings $T_2$, $T_3$ and $T_4$ can all be determined by calculation, where $$T_4 = (T_0 - T_1)/2 \text{ from:}$$

$$T_2 = T_0/2;$$

$$T_3 = T_0 - T_1/2; \text{ and}$$

$$T_4 = T_3 - T_2 = (T_0 - T_1)/2$$

By setting $T_4 = (T_0 - T_1)/2$, the trapezoidal wave comparative operation waveform 47 becomes symmetrical at the lower limit and the upper limit of the dynamic operation range, and the servo lock becomes faster at the start, or when an external perturbation occurs.

Figure 3:
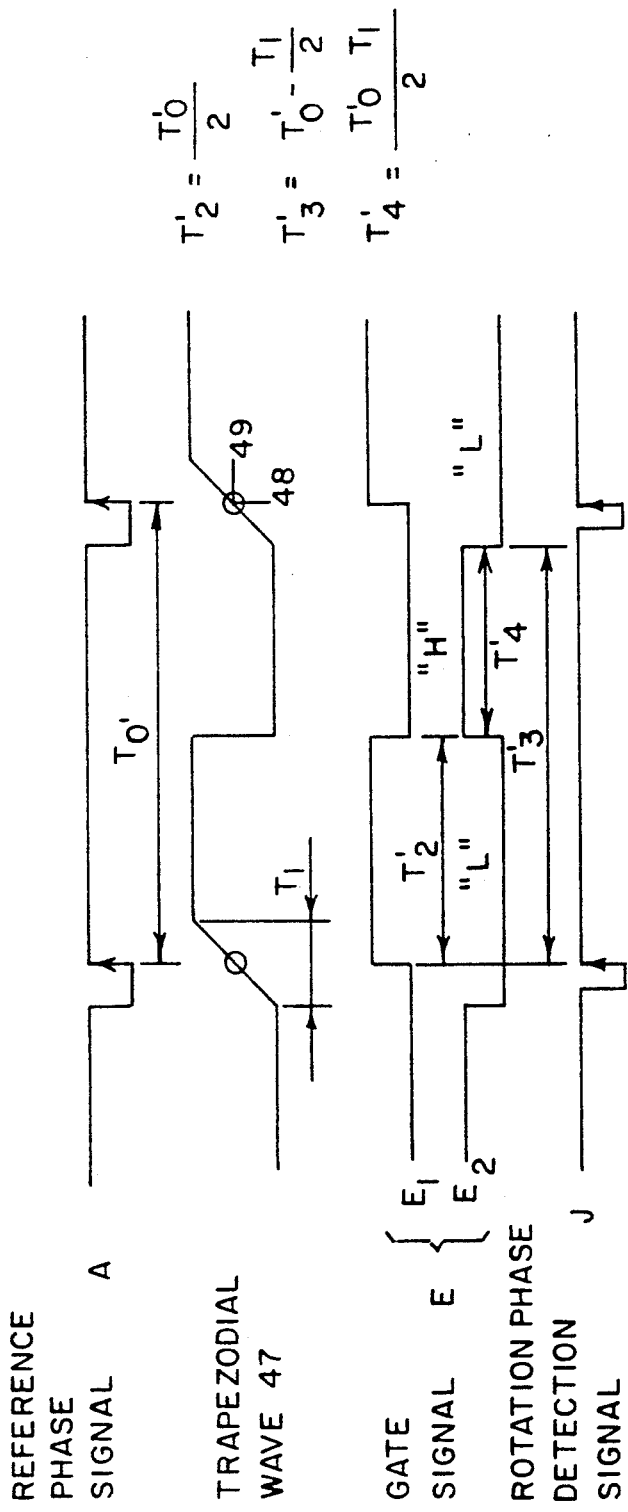

With the above arrangement, in a steady state, the falling point of the rotation phase detection signal J always coincides with a center 48 of the dynamic operation range period $T_1$. That is, the operational center of the phase system coincides with a center 49 of the dynamic operation range. For example, as shown in FIG. 3, considering a case in which the period of the reference phase signal A becomes longer, where $T_0'$ is a measured period, individual gate timings $T_2'$, $T_3'$, and $T_4'$ are determined by the calculation:

$$T_2' = T_0'/2;$$

$$T_3' = T_0' - T_1/2;$$

$$T_4' = (T_0' - T_1)/2$$

and the operational center of the phase system coincides with the center 49 of the dynamic operation range.

In the above mentioned description, the sloped portion of the trapezoidal wave comparative operation waveform 47 increases in value with time. However, on the contrary, the waveform may be one which decreases in value with time from the upper limit to the lower limit.

The speed error detection circuit 43 compares a target rotational speed K instructed by the system control circuit 42 with the FG signal H of multiple pulses per 1 turn, for indicating an actual motor speed, to determine a speed error amount. The speed error detection circuit 43 then outputs a speed error signal I to the phase compensation mixing circuit 44.

The phase compensation mixing circuit 44 adds the phase error signal F and the speed error signal I, selects a phase compensation of the entire system by an instruction from the system control circuit 42, and outputs a phase-compensated error signal L to the motor drive circuit 45.

The motor drive circuit 45 applies a current to the motor 31 according to the error signal L processed by the phase compensation mixing circuit 44 to rotate the motor 31.

The system control circuit 42 outputs a start/stop instruction to the motor 31 according to an on/off signal from the switch $SW_1$, and receives signals from individual keys (not shown) and those from the individual circuits to output a select (FG/PG) instruction to the switch $SW_2$, and a select (INT/EXT) instruction to the switch $SW_3$.

Figure 4:
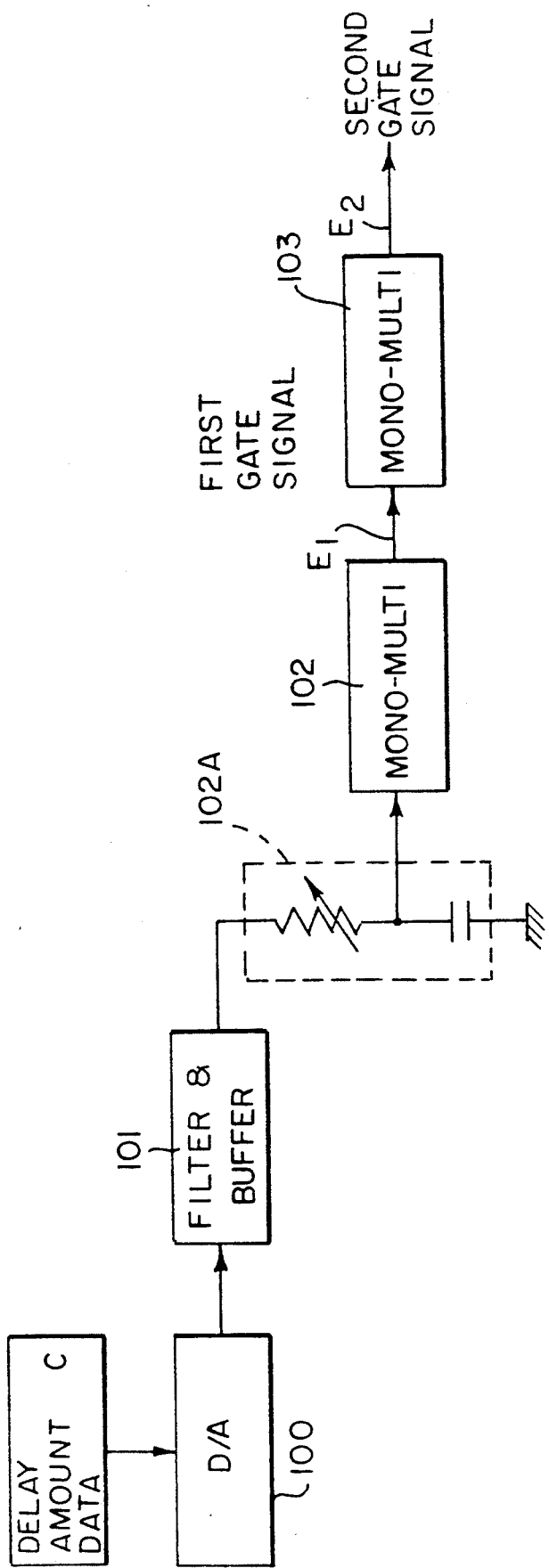
FIG. 4 is a schematic view showing an analog configuration of a variable delay circuit.

Next, an example of the arrangement of the variable delay circuit 38 will be described with reference to FIG. 4 and FIG. 5.

The variable delay circuit 38 may be of either an analog or a digital configuration. FIG. 4 shows an example of analog configuration. Referring to FIG. 4, the delay amount data C is converted to an analog voltage by a D/A converter 100, and is processed by a filter and buffer circuit 101 to obtain a source voltage for a CR charge/discharge circuit 102A of a monomultivibrator 102. Specifically, by varying the source voltage for the CR charge/discharge circuit 102A of the monomultivibrator 102 by the delay amount data C, a first gate signal $E_1$ is formed by the monomultivibrator 102. A second gate signal $E_2$ is then outputted, in which the delay time is controlled to $T_3 = T_0 - T_1/2$ by a monomultivibrator 103.

Figure 5:
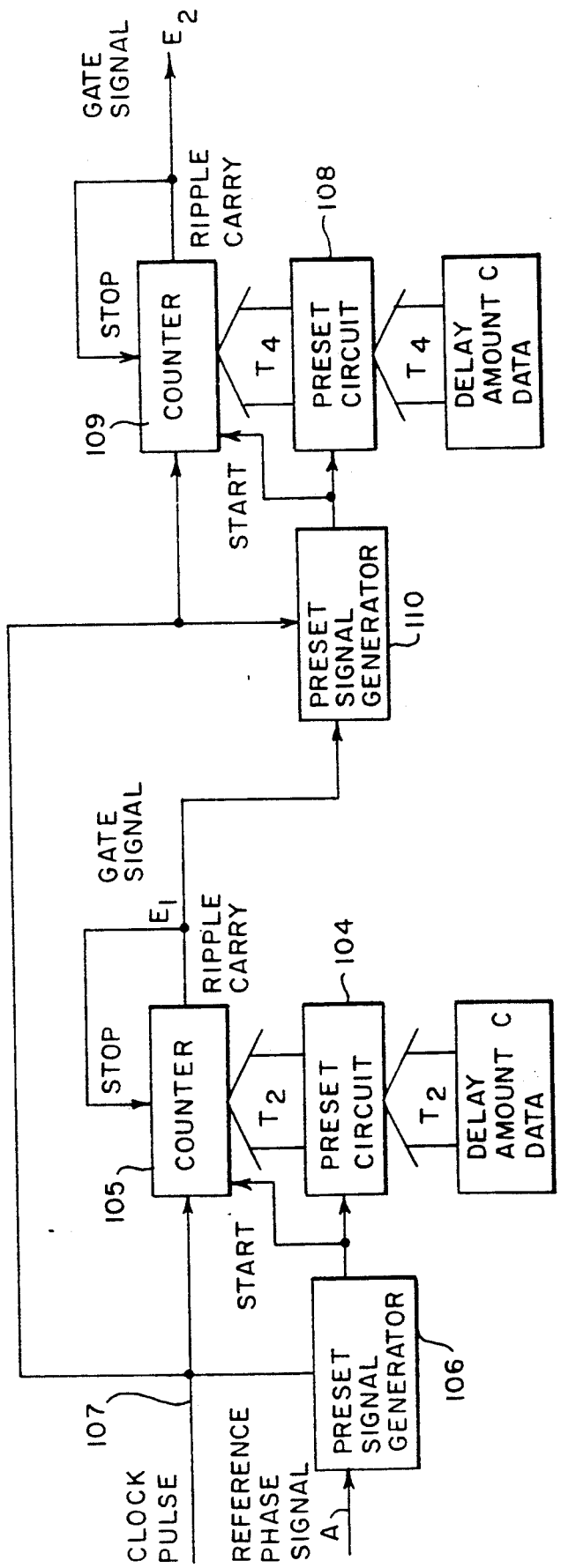
FIG. 5 is a schematic view showing a digital configuration of the variable delay circuit.

FIG. 5 shows an example of a digital configuration of the variable delay circuit 38. Referring to FIG. 5, by presetting the delay amount data C to counters 105 and 109 through preset circuits 104 and 108, the time until the counters 105 and 109 generate ripple carry is controlled. Specifically, a preset signal generation circuit 106 receives a clock pulse 107 at the rising of the reference phase signal A. The present signal generation circuit 106 then applies the signal to a preset circuit 104 to preset a time $T_2 = T_0/2$ from the delay amount data C, and also applies the signal to the counter 105 to start counting. The counter 105 counts the clock pulse 107 to generate a ripple carry (borrow or carry output) which stops the counting. The ripple carry is generated by delaying by $T_2 = T_0/2$ according to the delay amount data C, which is used as the first gate signal $E_1$.

In addition, a preset signal generation circuit 110 takes in the clock pulse 107 at the falling of the first gate signal $E_1$. The present signal generation circuit 110 then applies the signal to a preset circuit 108 to preset a time $T_4 = (T_0 - T_1)/2$ from the delay amount data C, and also applies the signal to the counter 109 to start counting. The counter 109 counts the clock pulse 107 to generate a ripple carry (borrow or carry output) which stops the counting. The ripple carry generated is $T_2 + T_4$, and is delayed by $T_3 = T_0 - T_1/2$, for use as the second gate signal $E_2$.

Figure 6:
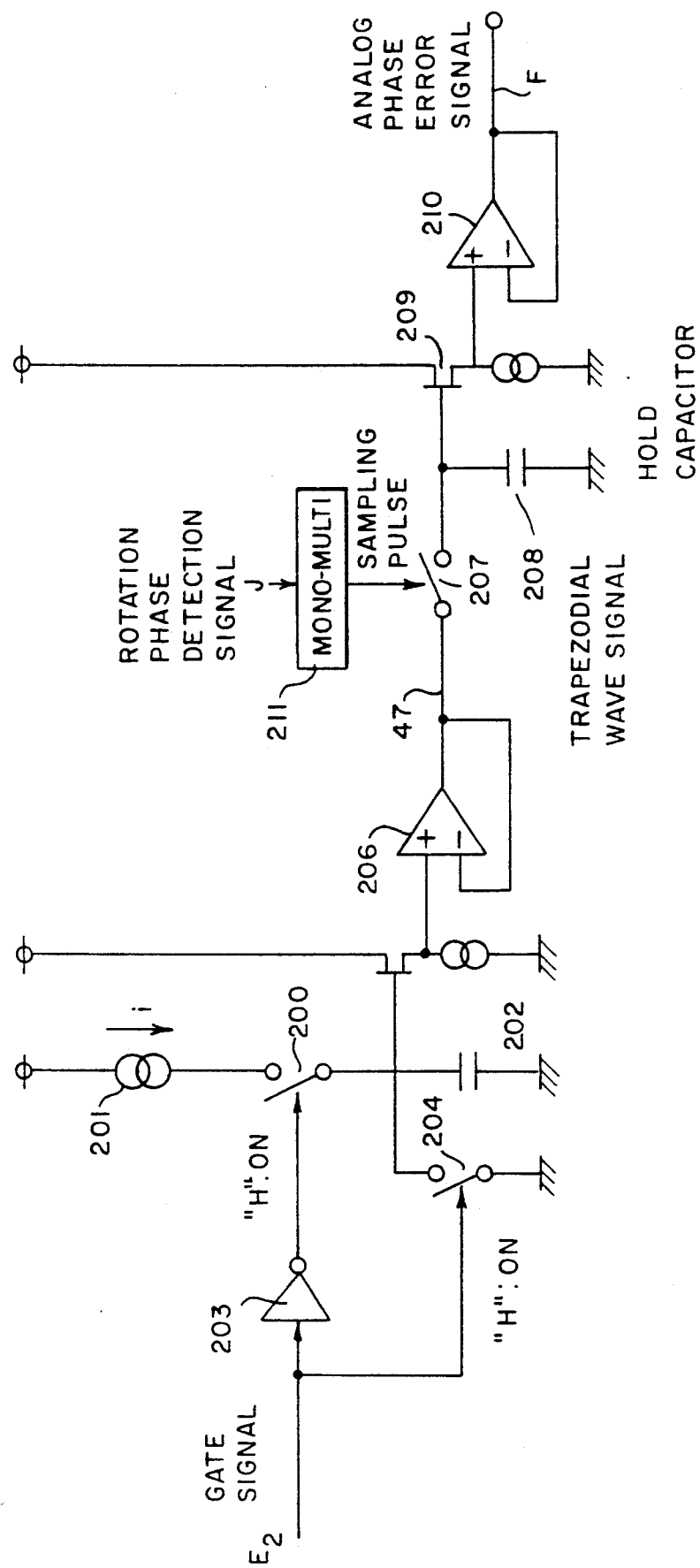
FIG. 6 is a schematic view showing an analog configuration of a phase error detection circuit.

The arrangement of the phase error detection circuit 39 will be described with reference to FIG. 6 and FIG. 7.

The phase error detection circuit 39 may also be of either an analog or a digital configuration. FIG. 6 shows an example of an analog configuration. Referring to FIG. 6, while the second gate signal $E_2$ is at a low level "L," a switch 200 is set to on through an inverter 203, to charge a capacitor 202 with a constant current i from a constant current source 201. This forms a sloped portion the (dynamic operation range) of the trapezoidal comparative operation waveform 47 by an integration effect and forms a saturation effect which limits the charged voltage to the source voltage. In this case, $T_1 \approx VC/i$, where V is a source voltage, i is a current, and C is a capacitor capacitance. While the second gate signal $E_2$ is at a high level "H," a switch 204 is turned on to rapidly discharge the capacitor 202. The voltage across terminals of the capacitor 202 is passed through an FET (field effect transistor) circuit 205 and a buffer circuit 206 to obtain the trapezoidal comparative operation waveform 47. A sampling switch 207 is turned on by a sample and hold pulse generated by a monomultivibrator 211 at the rising point of the rotation phase detection signal J. The voltage of the trapezoidal comparative operation waveform 47, at this moment, is held by a capacitor 208. The voltage of the capacitor 208 is passed through an FET circuit 209 and a buffer circuit 210 and is outputted as a phase error signal F.

Figure 7:
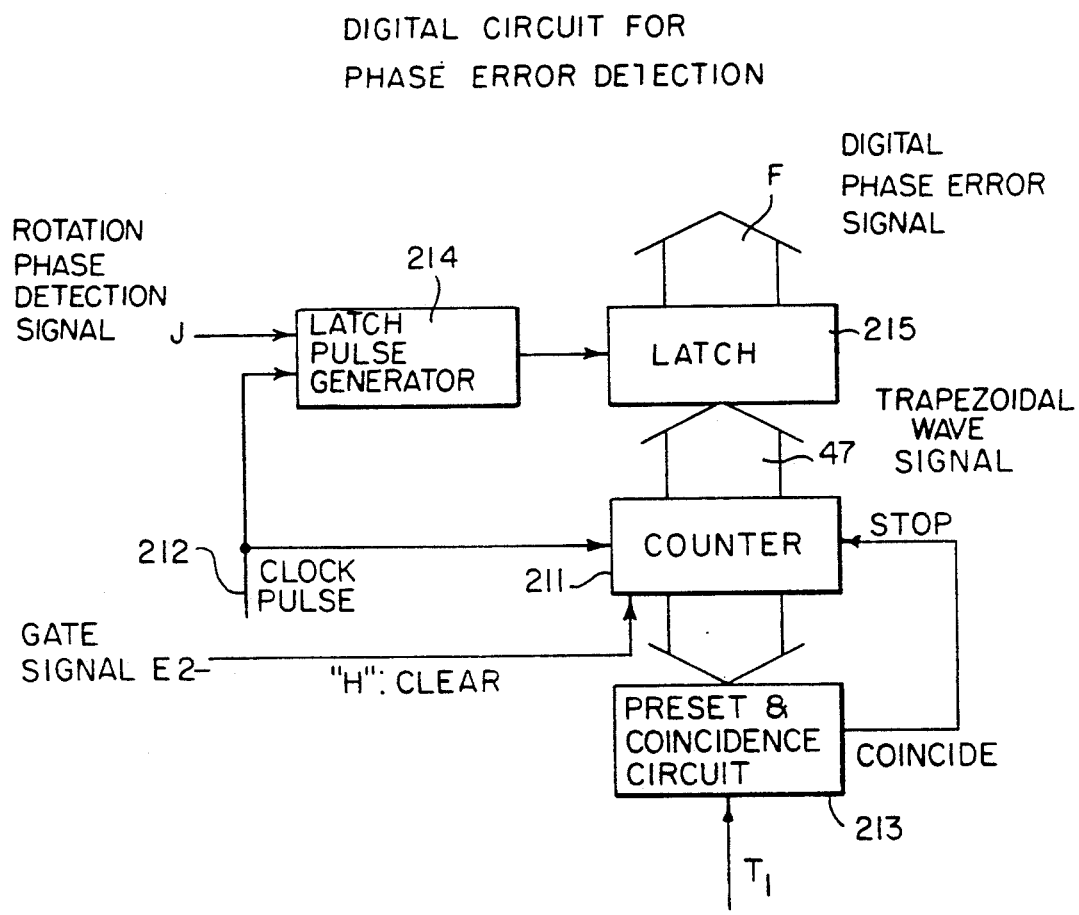
FIG. 7 is a schematic view showing a digital configuration of the phase error detection circuit.
Figure 8:
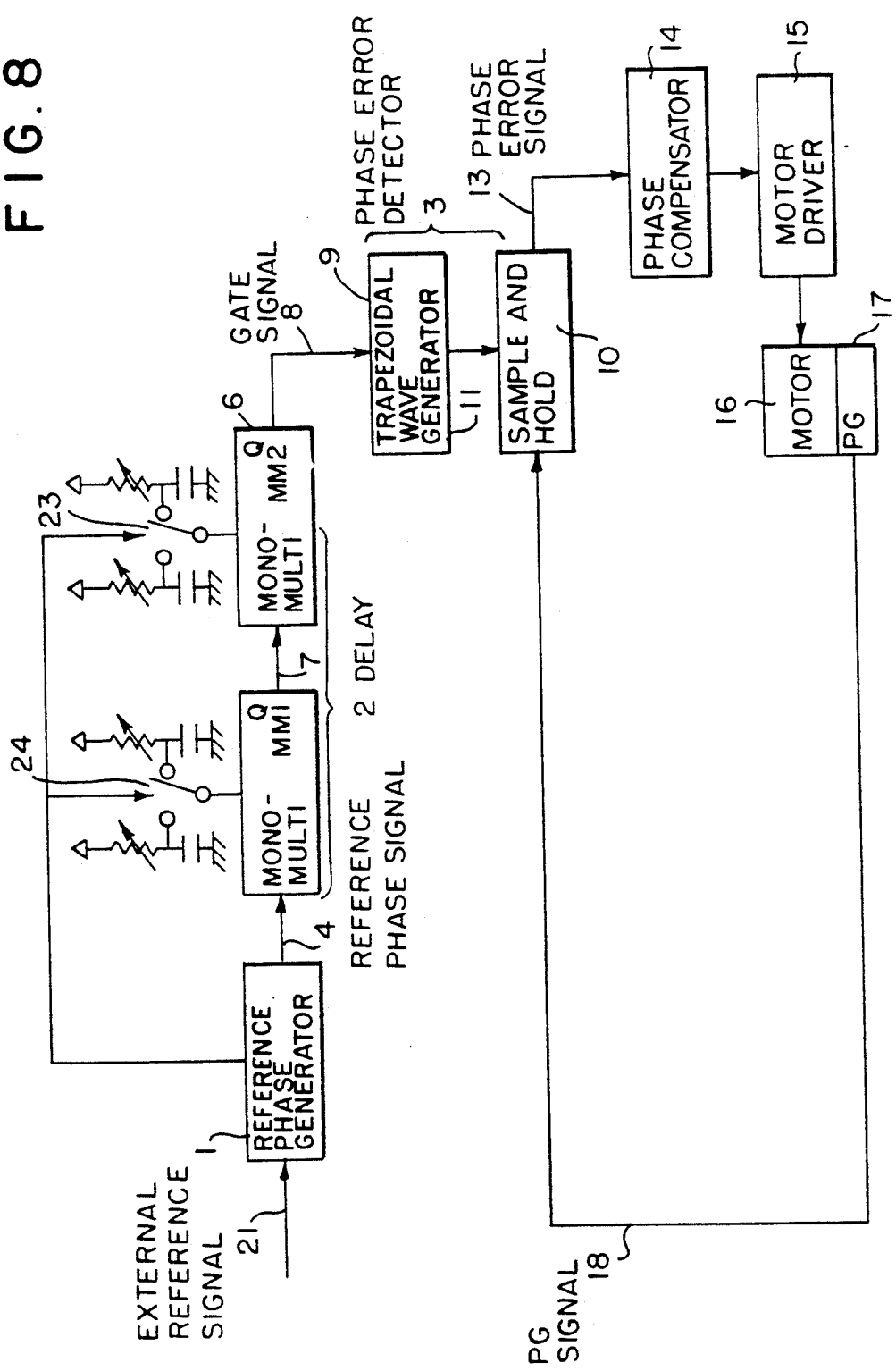
FIG. 8 is a diagram of a conventional circuit.
Figure 9:
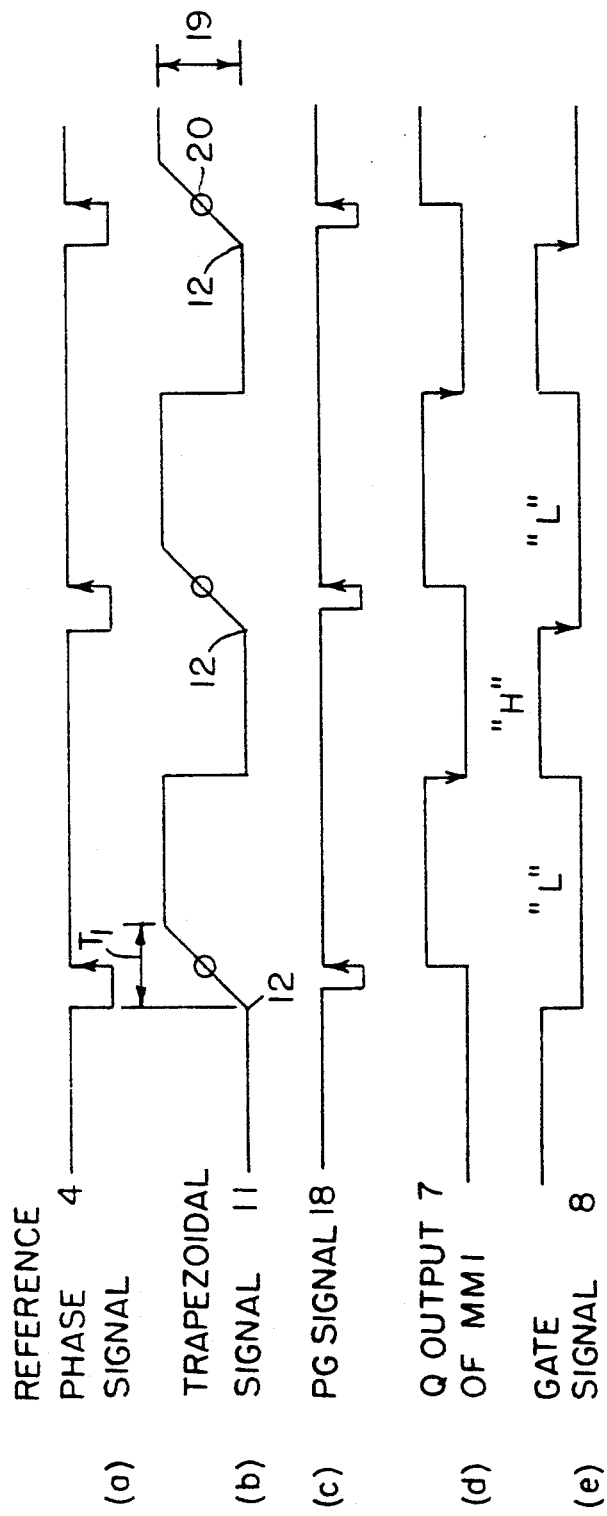
FIG. 9 and FIG. 10 are diagrams showing the operation timing.
Figure 10:
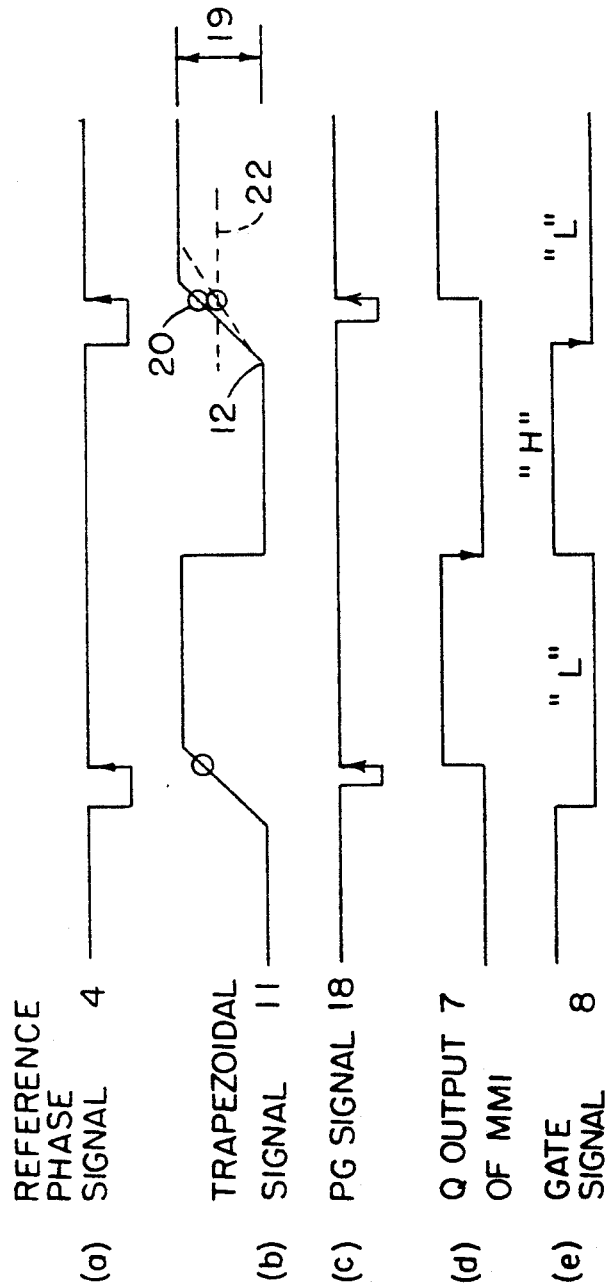

FIG. 7 shows an example of a digital configuration of the phase error detection circuit 39. A counter 211 is cleared for a time $T_4$ when the second gate signal $E_2$ is at a high level. The counter 211 counts while the signal is at a low level. The counter 211 begins counting a clock pulse 212 and stops counting when a preset coincidence circuit 213 outputs a coincidence signal. The preset coincidence circuit 213 is previously set with a dynamic operation period $T_1$, and outputs a coincidence a signal when the counting value coincides with $T_1$. This changes the count output of the counter 211, with time, to the form of the trapezoidal comparative operation waveform 47. A latch pulse generation circuit 214 receives the clock pulse 212 at the rising point of the rotation phase detection signal J. The latch pulse generation circuit 214 then applies the signal to a latch circuit 215 to hold the counting value of the counter 211 at that time, which is outputted as the phase error signal F.

As described above, by controlling the delay amount $T_3$ of the variable delay circuit 38 to be $T_3 = T_0 - T_1/2$, according to the measured period $T_0$ of the reference phase signal A and the dynamic operation period $T_1$, the operational center of the phase system is brought in line with the center of the dynamic operation range. Therefore, a steady position deviation is eliminated even when the period varies; the phase system operates symmetrical in the dynamic operation range; and the servo lock of a phase is positively and rapidly achieved at either the starting of the motor 31 or when an external perturbation occurs.

The following conditions (1) and (2) are examples of the changing period of the reference phase signal:

(1) Since the period of the vertical sync signal ($V_{sync}$) basically differs depending on which video signal is to be recorded or reproduced by an electronic still camera, the NTSC system or the PAL system, the period of the reference phase signal is selected.

(2) When the electronic still camera is used for the primary purpose of the camera, an internal signal of a much shorter period is used as a reference phase signal, rather than using $V_{sync}$ of video signal as a reference phase. Further more, the FG signal H of the motor 31 is used as the rotation phase detection signal J to shorten the servo lock time. When an external video signal is recorded or when a signal is reproduced in synchronism with the video signal, $V_{sync}$ of the video signal is used as a reference phase signal. In addition, the PG signal G of the video floppy disk is used as the rotation phase detection signal J.

The above-described embodiment is for phase control over an electronic camera motor. However, this invention is not limited to the above described embodiment. For example, the motor to which the present invention is applied can be a VTR capstan motor and the like.

With the motor servo apparatus according to the present invention, even when the period of reference phase signal varies, the period is measured to bring the operational center of the phase system in line with the center of the dynamic operation range of the comparative operation waveform, for thereby eliminating a steady position deviation.

Furthermore, the operation is made symmetrical in the dynamic operation range to achieve a rapid servo lock and a stable phase control over the motor, even at the start of the motor or when an external perturbation occurs.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claim is

1. A motor servo apparatus for controlling a rotation phase of a motor to be synchronized with a reference phase signal, comprising:
   a reference phase period detecting circuit for measuring a period of the reference phase signal;

a variable delay circuit, having a variable delay amount, for receiving and delaying said reference phase signal and outputting a resultant gate signal to determine a starting point of a dynamic operation range of a comparative operation waveform of a phase error detection circuit; and a delay amount control circuit for controlling the variable delay amount of said variable delay circuit, said delay amount control circuit controlling said variable delay amount, such that said variable delay amount is $T_0 - T_1/2$, wherein $T_0$ is the measured period of the reference phase signal and $T_1$ is a period of said dynamic operation range.

2. The motor servo apparatus of claim 1, further a setting circuit for setting said comparative operation waveform of said phase error detection circuit to one of an upper limit and a lower limit of said dynamic operation range for a dynamic operation period, said dynamic operation period being equal to $(T_0 - T_1)/2$.

3. The motor servo apparatus of claim 1, wherein said delay amount control circuit outputs said variable delay amount $T_3$ as digital data, and wherein said variable delay circuit includes, a D/A (digital-to-analog) converter for converting the digital delay amount data to an analog voltage, a CR series circuit as a charge/discharge circuit which receives and is applied with the analog voltage from said D/A converter, a first monomultivibrator which receives and is triggered by said reference phase signal, and a second monomultivibrator which is triggered, by an output pulse from said first monomultivibrator, for outputting said resultant gate signal.

4. The motor servo apparatus of claim 1, wherein said delay amount control circuit outputs said variable delay amount as digital data, and wherein said variable delay circuit includes, a first preset circuit for presetting a first numerical value corresponding to the digital delay amount data when said reference phase signal is received, a first counter for counting a first preset number of clock pulses based on said first numerical value preset in said first preset circuit, a second preset circuit for presetting a second numerical value corresponding to a period of one of an upper limit and a lower limit of said comparative operation waveform upon said first counter counting the first preset number of clock pulses, and a second counter for counting a second preset number of clock pulses based upon said second numerical value preset in said second preset circuit, and outputting said resultant gate signal.

5. The motor servo apparatus of claim 1, wherein said phase error detection circuit includes, a constant current circuit, a first capacitor connected in series with said constant current circuit, a first switch, connected in series with said first capacitor, which turns on for a first period of time when said resultant gate signal is in a first state of a two state signal, a second switch, connected in parallel with said first capacitor, which turns on for a second period of time when said resultant gate signal is in a second state of said two state signal, a trapezoidal wave generation circuit, inputted with a voltage across terminals of said first capacitor, for generating a trapezoidal voltage signal, a second capacitor, applied with the trapezoidal voltage signal through a third switch, and a monomultivibrator for outputting a signal to turn on said third switch only at a time when a rotation phase detection signal is received.

6. The motor servo apparatus of claim 1, wherein said phase error detection circuit includes a counter, which starts counting clock pulses every time said resultant gate signal is in a first state of a two state signal, a stopping circuit for stopping said counter from counting when a count value of said counter coincides with a value corresponding to the period $T_1$, of said dynamic operation range, and an outputting circuit for outputting said count value of said counter as phase error data when a rotation phase detection signal is received.

7. A method for controlling a rotation phase of a motor to be synchronized with a reference phase signal by a motor servo apparatus, comprising the steps of:

(a) measuring a period of the reference phase signal;

(b) receiving and delaying the reference phase signal by a variable delay circuit having a variable delay amount;

(c) outputting a resultant gate signal from said variable delay circuit to determine a starting point of a dynamic operation range of a comparative operation waveform from a phase error detection circuit; and (d) controlling said variable delay amount of said variable delay circuit such that said variable delay amount is $T_0 - T_1/2$, wherein $T_0$ is the measured period of the reference phase signal and $T_1$ is a period of said dynamic operation range.

8. The method of claim 7, further comprising the step of setting said comparative operation waveform to one of an upper limit and a lower limit of said dynamic operation range for a dynamic operation period being equal to $(T_0 - T_1/2$.

9. The method of claim 7, wherein said variable delay circuit outputs said variable delay amount as digital data at said step (c) and further comprising the steps of:

(e) converting the digital delay amount data to an analog voltage;

(f) receiving and applying said analog voltage from said step (e) to a charge/discharge circuit;

(g) receiving the reference phase signal by a first monomultivibrator which is triggered by the reference phase signal;

(h) outputting said resultant gate signal by a second monomultivibrator which is triggered by an output pulse from said first monomultivibrator.

10. The method of claim 7, wherein said variable delay amount controlled at said step (d) is output as digital data and further comprising the steps of:

(e) presetting a numerical value corresponding to the digital delay amount data when the reference phase signal is received;

(f) counting a first preset number of clock pulses based on said numerical value preset at said step (e);

(g) presetting a second numerical value corresponding to a period of one of an upper limit and a lower limit of said comparative operation waveform upon counting said first preset number of clock pulses at said step (f);

(h) counting a second preset number of clock pulses based upon said second numerical value preset at said step (g); and (i) outputting said resultant gate signal.

11. The method of claim 7, further comprising the steps of:

(e) turning on a first switch connected in series with a first capacitor, which is connected in series with a constant current circuit, for a first period of time when said resultant gate signal is in a first state of a two state signal;

(f) turning on a second switch connected in series with said first capacitor for a second period of time when said resultant gate signal is in a second state of said two state signal;

(g) generating a trapezoidal voltage signal from a trapezoidal wave generation circuit, which is inputted with a voltage across terminals of said first capacitor;

(h) applying said trapezoidal voltage signal to a second capacitor through a third switch; and (i) outputting a signal to turn on said third switch only at a time when a rotation phase detection signal is received.

12. The method of claim 7, further comprising the steps of:

(e) counting clock every time said resultant gate signal is in a first state of a two state signal;

(f) stopping said gate (e) from counting when a count value coincides with a value corresponding to the period $T_1$ of said dynamic operation range; and (g) outputting said count value as phase error data when a rotation phase detection signal is received.

* * * * *